US010249450B2

United States Patent
Jörimann et al.

(10) Patent No.: US 10,249,450 B2
(45) Date of Patent: Apr. 2, 2019

(54) SWITCH FOR A SEAT BELT BUCKLE

(71) Applicant: Autoliv Development AB, Vårgårda (SE)

(72) Inventors: Beat Jörimann, Bonaduz (CH); Carsten Käbisch, Domat/Ems (CH); Marco Mussato, Sevelen (CH)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/123,821

(22) PCT Filed: Mar. 5, 2015

(86) PCT No.: PCT/EP2015/054647
§ 371 (c)(1),
(2) Date: Sep. 6, 2016

(87) PCT Pub. No.: WO2015/132348
PCT Pub. Date: Sep. 11, 2015

(65) Prior Publication Data
US 2017/0011865 A1 Jan. 12, 2017

(30) Foreign Application Priority Data
Mar. 7, 2014 (DE) .................. 10 2014 204 199

(51) Int. Cl.
*B60R 22/34* (2006.01)
*H01H 1/50* (2006.01)
(Continued)

(52) U.S. Cl.
CPC .............. *H01H 1/50* (2013.01); *B60R 22/48* (2013.01); *H01H 27/002* (2013.01); *B60R 2022/4816* (2013.01); *Y10T 24/45712* (2015.01)

(58) Field of Classification Search
CPC ............ B60R 2022/4816; B60R 22/48; B60R 2022/4891; B60R 2022/4866;
(Continued)

(56) References Cited

U.S. PATENT DOCUMENTS 3,956,603 A     5/1976   Fisher
4,012,612 A  *  3/1977   Loomba .................. B60R 22/48
                                                200/242

FOREIGN PATENT DOCUMENTS

DE    10 2006 050 239 A1   4/2008
DE    20 2008 005 658 U1   8/2008
(Continued)

OTHER PUBLICATIONS

German Examination Report—dated Sep. 17, 2014.
PCT International Search Report—dated Jul. 5, 2015.

*Primary Examiner* — Ahmed M Saeed
(74) *Attorney, Agent, or Firm* — Brinks Gilson & Lione

(57) ABSTRACT

A switch for a belt buckle of a seatbelt device including at least two contact elements (4, 5) abutting on each other or reaching into abutment on each other in a cavity of the switch, wherein at least one of the contact elements (4, 5) is configured as a movable contact spring. An insertion channel (8) is provided into which a belt tongue, a locking part, an ejector (7) or a part movably coupled with one of these parts is insertable and removable at least with a section during the locking and unlocking movement of the belt tongue. A movably supported coupling member (3) protrudes with a first section (10) into the insertion channel (8) and includes a second section (11) associated with the contact spring. The movably supported coupling member (3) abuts via the second section (11) on the contact spring in a position-independent manner.

10 Claims, 3 Drawing Sheets

(51) Int. Cl.
*B60R 22/48* (2006.01)
*H01H 27/00* (2006.01)

(58) Field of Classification Search
CPC ............... Y10T 24/32; Y10T 24/45241; Y10T 24/45623; Y10T 24/2136; Y10T 24/2168; Y10T 24/40; Y10T 24/45529; Y10T 24/45581; Y10T 24/45644; Y10T 24/45696; Y10T 24/45712; Y10T 24/45791; Y10T 29/49
USPC ....... 200/61.58 B, 61.58 R, 1 R, 16 A, 17 R, 200/18; 24/633, 163 R, 615, 625, 637, 24/647, 650, 665, 68 SB, 69 SB
See application file for complete search history.

(56) References Cited

FOREIGN PATENT DOCUMENTS

| | | |
|---|---|---|
| DE | 10 2011 089 645 A1 | 7/2012 |
| DE | 20 2013 011 529 U1 | 4/2014 |
| WO | WO 2013/127377 A1 | 9/2013 |

\* cited by examiner

SWITCH FOR A SEAT BELT BUCKLE

CROSS REFERENCE TO RELATED APPLICATIONS

This application claims priority to German Patent Application No. 10 2014 204 199.6, filed on Mar. 7, 2014 and PCT/EP2015/054647, filed on Mar. 5, 2015.

FIELD OF THE INVENTION

The invention relates to a switch for a belt buckle of a seat belt.

BACKGROUND

In principle, switches in motor vehicle seat belt buckles serve to recognize a belt tongue locked in the belt buckle. If an occupant is recognized as occupying the vehicle seat via a suitable sensor device, but no signal representing a locked belt tongue is generated by the switch, then, for example, an optical and/or acoustic signal can be generated, which is only switched off if the occupant has buckled up, i.e., if a belt tongue is locked in the belt buckle. Furthermore, the signal can also be used to provide that in the case of an accident certain additional restraining devices, such as, for example, airbag devices, are not activated or only activated if a locked belt tongue has been recognized, i.e., if the switch has generated a signal.

Possible embodiment of such switches include contactless Hall sensors, which, however, are susceptible and proper operation in response to external magnetic fields.

Furthermore, the use of mechanical switches is known, for example, from EP 1 485 276 B1 or DE 10 2012 208 779 A1. In these switches, two electrically conductive contact elements are provided which are part of an electrical circuit. One of the contact elements is configured as a contact spring and protrudes with a section in an insertion channel in which an ejector of the belt buckle is pushed during the locking movement of the belt tongue. Due to the insertion of the ejector it reaches direct abutment on the contact spring so that the contact spring is compelled into a movement whereby the contact of the contact elements is opened or closed. Due to the opening or the closing of the contact, a signal is generated which is representative of the belt tongue locked in the belt buckle. Depending on whether the signal is generated by closing or opening of the contact of the contact elements, the switch is also referred to as closer or opener. So that the contact is securely opened or closed, the contact spring projects at least with a section in the insertion channel, while the contact point is disposed in a protected cavity outside the insertion channel. The contact spring must therefore have a complex geometry so that the inserted part inevitably comes into abutment on the contact spring in any event, and the contact spring is correspondingly moved during the further insertion movement for opening or closing of the contact.

The functionality of the switch thus depends on the compliance of the complex geometry of the contact spring, which can be changed, for example, by the continuous load of a plurality of actuation cycles. Furthermore, the contact spring must be configured to be abrasion-resistant and have sufficient flexural strength for a very high number of insertion operations of the belt buckle so that the signal is generated in a functionally secure manner even after a long service life of the belt buckle. In addition the contact spring, as part of the contact, must of course also fulfill the requirements with respect to electrical conductivity.

Furthermore a belt buckle is known from U.S. Pat. No. 3,956,603 wherein the contact pairing with a contact spring and a fixed contact is disposed outside the insertion channel, while the movement of the contact spring is compelled by a coupling member projecting into the insertion channel. The pivotable coupling member projects with a first section into the insertion channel, and is shaped and supported such that it is pivoted by the inserted belt tongue during the insertion movement and comes into abutment on the contact spring via a second section. During the further insertion movement of the belt tongue, the coupling member is further pivoted, whereby the contact spring performs a movement with respect to the fixed contact and the contact is opened. The contact member is supported here via an additional spring on the housing of the switch so that it is urged in a spring-loaded manner into a position wherein it engages in the insertion channel via the first section. The advantage of this solution can be seen in that the contact spring no longer itself engages in the insertion channel, and the opening movement of the contact spring is coupled by the coupling member whose movement is itself compelled in turn by the inserted belt tongue. The ejector or the belt tongue thus abut on the coupling member instead of on the contact spring; the coupling member transfers the movement. Overall the contact spring can thereby be preserved. In addition, the contact spring can thereby have a much simpler geometry so that it is simpler to manufacture and its function in particular is no longer dependent on the compliance with the complex geometry. Furthermore, the contact spring can be designed more simply and more functionally secure for the required flexural strength.

The object of the present invention is to provide a cost-effectively manufactured switch for a belt buckle of a seatbelt device with a further-improved functional security.

SUMMARY

According to a feature of the invention it is proposed that the movably supported coupling member abuts on the contact spring via the second section in a position-independent manner. The proposed solution has a plurality of advantages. First, the movement of the coupling member is transmitted by the proposed solution directly and without temporal delay to the contact spring. Second, the coupling member and the contact spring are coupled directly to each other so that the movement of the part inserted in the insertion channel is directly transmitted to the contact spring with a smallest-possible number of parts, whereby the probability of damage can be reduced. Furthermore, the coupling member can be secured via the contact spring in the position wherein it engages in the insertion channel via the second section so that the previously required additional spring element can be omitted. The coupling member and the contact spring in practice form a movably coupled connection, using which the opening and closing of the contact can be realized with the smallest possible number of parts. Here it is important that the coupling member abuts on the contact spring in a position-independent manner, i.e., both in the closed position and in the opened position of the contact elements of the switch, in order to on the one hand make possible the direct transmission of the movement to the contact spring, and on the other hand to secure the coupling member in the position engaging in the insertion channel prior to the inserting of the part in the insertion channel. The coupling member is thus clamped directly between the contact spring and the part inserted in the insertion channel starting from the position from which the part inserted in the insertion channel reaches abutment on the first section of the coupling member.

It is further proposed that the coupling member and the contact spring are movably guided with respect to each other by an interference-fit engagement. Due to the proposed solution, the probability of damage can be reduced by the probability of an inadvertent slippage of the contact spring from the second section of the coupling member.

A particularly advantageous, and in particular, two-sided guiding can be realized by the guiding being formed by a groove in the contact spring and a projection of the coupling member engaging into the groove.

It is further proposed that the coupling member is pivotably supported and the contact spring is disposed with respect to the coupling member such that the groove is oriented with its longitudinal direction perpendicular to the pivot axis of the coupling member. Due to the proposed arrangement of the contact spring and the orientation of the groove, the coupling member and the contact spring are guided as well as possible with respect to each other during the pivot movement of the coupling member, wherein the groove can also specify the movement of the contact spring and the contact closing or contact opening can thereby be further improved.

It is further proposed that the contact elements abut on each other in the position wherein the coupling member projects in the insertion channel via the second section, and the coupling member is positionally fixed at least in one direction by the abutment on the contact spring and the abutment of the contact spring on the other contact element. The coupling member is also positionally fixed via the contact spring such that uncontrolled movements of the coupling member and the probability of a functional failure caused by them, e.g., by a loosening of the coupling member, can be reduced.

This positional fixing of the coupling member can be further strengthened by the contact spring being spring-loaded, i.e. preloaded in one direction. Here in the present embodiment the coupling member is preloaded towards the position wherein it projects into the insertion channel via the first section, so that the part inserted in the insertion channel in a subsequent buckling operation again reaches abutment on the first section and the coupling member pivots accordingly.

It is further proposed that the coupling member includes at least one bearing pin, via which the coupling member is pivotably supported about a pivot axis, and the first and second section extend radially outward with respect to the pivot axis. The coupling member can thereby perform a pivot movement while the first and the second section perform the movement required for releasing or closing the contact. Here the first section of the coupling member serves for triggering the movement by the abutment on the part inserted in the insertion channel, and the second section serves for transmitting the movement to the contact spring.

It is further proposed that the first and the second section are disposed offset to each other in the longitudinal direction of the bearing pin. Due to the proposed arrangement of the two sections on the bearing pin they can be individually designed and shaped independent of each other for engagement in the insertion channel and for abutment on the contact spring.

Furthermore, according to a further preferred embodiment it is proposed that the distance between the contact point on which the part insertable in the insertion channel comes into abutment on the first section, and the pivot axis is greater than the distance between the contact point on which the contact spring abuts on the second section, and the pivot axis of the coupling member. Due to the proposed ratio of the distances a type of translation of the movement and thus also a translation of the force exerted by the part inserted in the insertion channel on the first section of the coupling member can be realized, wherein the force, which is exerted by the part inserted in the insertion channel on the first section of the coupling member is translated into a larger force exerted by the second section on the contact spring. Furthermore the movement of the first section can simultaneously be translated into a smaller movement of the second section and thus also into a smaller movement of the contact spring, which is acceptable in this respect since the contact spring need only be released from the other contact element, for which purpose only a very small movement of the contact spring is sufficient. This can be further advantageously used since the necessary free space around the contact spring, which is required so that the contact spring can perform the movement, can thereby be designed smaller. Overall the switch can thereby be embodied smaller, which in turn is favorable with respect to the only very small installation space available in the belt buckle. Contact surfaces should also be understood to be contact points wherein the distances are then understood to be from the centers of the contact surfaces to the pivot axis.

BRIEF DESCRIPTION OF THE DRAWINGS

In the following the invention is explained based on a preferred embodiment with reference to the accompanying Figures.

DETAILED DESCRIPTION

Figure 1:
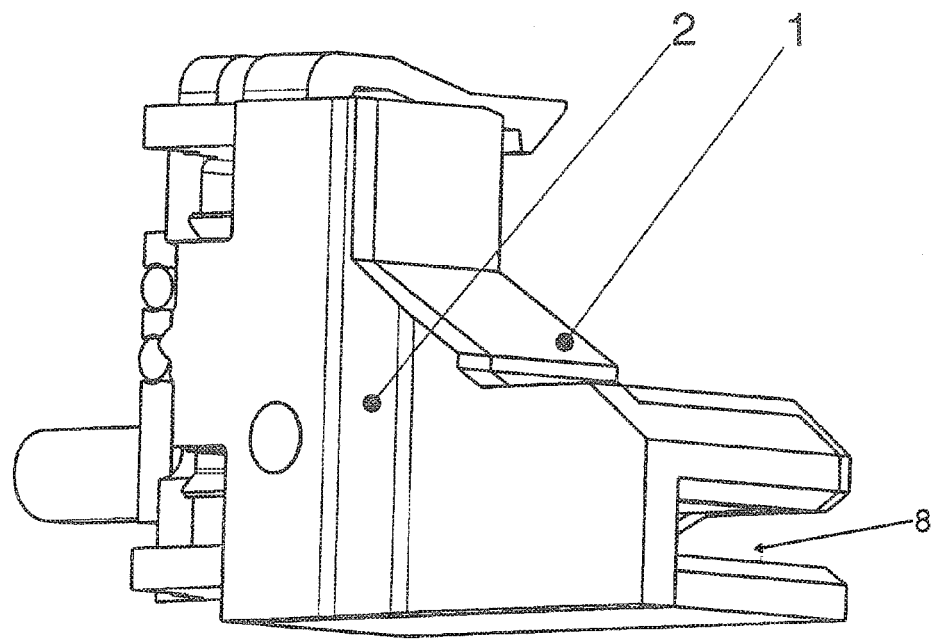
FIG. 1 shows an inventive switch in accordance with the present invention.
Figure 2:
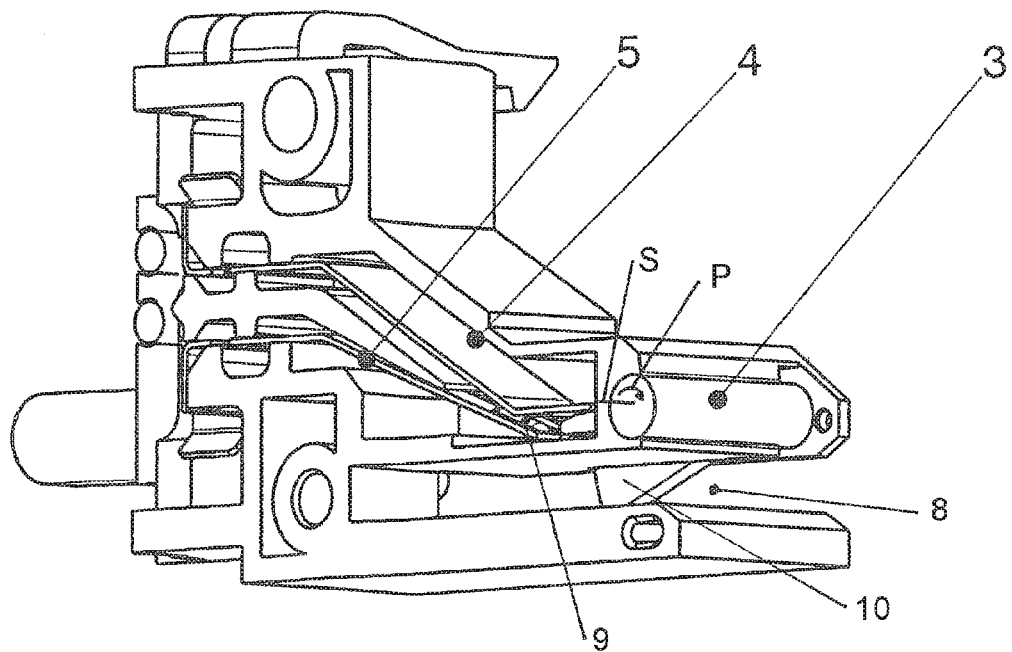
FIG. 2 shows the switch from FIG. 1 without a cover.
Figure 3:
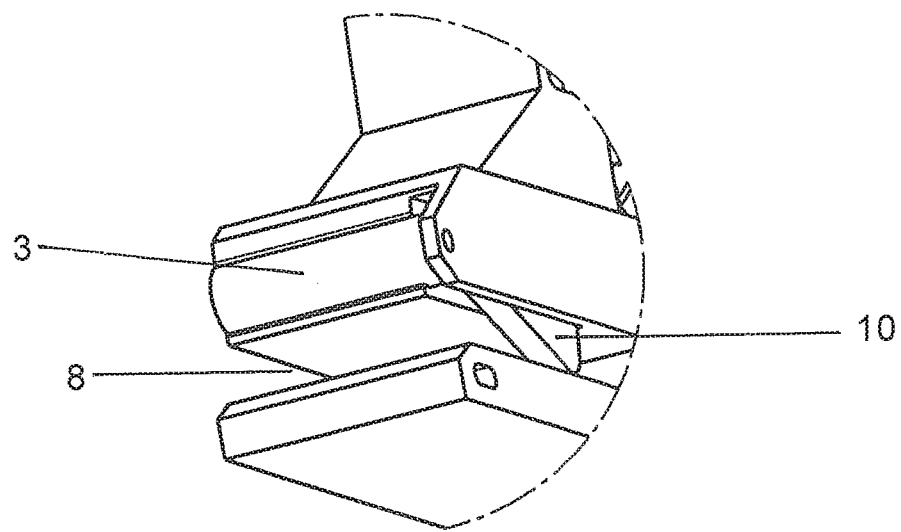
FIG. 3 shows and large cutaway a section of the switch.

In FIG. 1 an inventive switch with a housing 1 and a cover 2 laterally covering the housing 1 can be seen. The same switch is depicted in FIG. 2 without the cover 2 so that two contact elements 4 and 5 disposed in the housing 1 and a coupling member 3 disposed therein can be seen. The switch further includes an insertion channel 8 that can be seen in FIG. 3, which is closed on one side by the cover 2 and formed by two planar and parallel walls of the switch.

The lower contact element 5 in the depiction is formed by a curved contact plate, which includes on one end a projection 9 projecting towards the other contact element 4 and is clamped between two walls of the housing 1. The lower contact element 5 can thereby be viewed as fixed. The upper contact element 4 in the depiction is also formed by a curved contact surface, which is clamped with one end between two walls of the housing 1. The free end of the upper contact element 4 protrudes into a free space 13 of the housing 1 and is slightly movable such that it is deliberately arranged so as to be able to perform certain movements for opening and closing the contact. The upper contact element 5 thus forms the movable contact spring.

Figure 4:
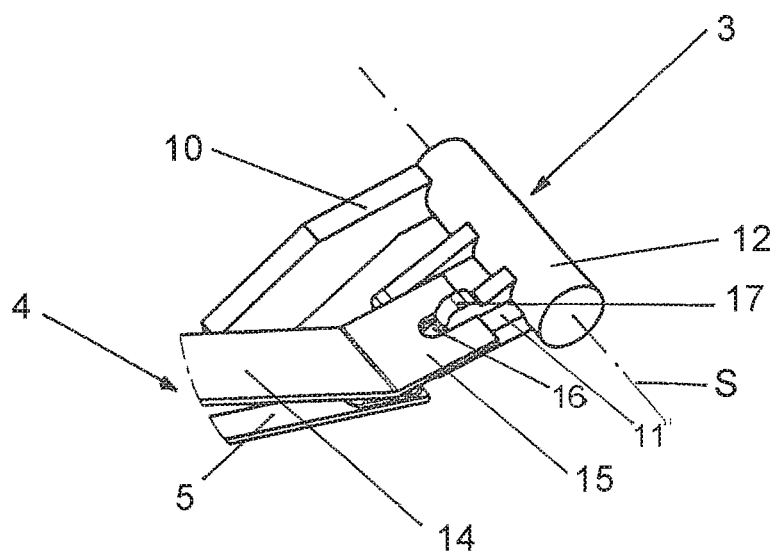
FIG. 4 shows the coupling member with the abutting contact spring.
Figure 5:
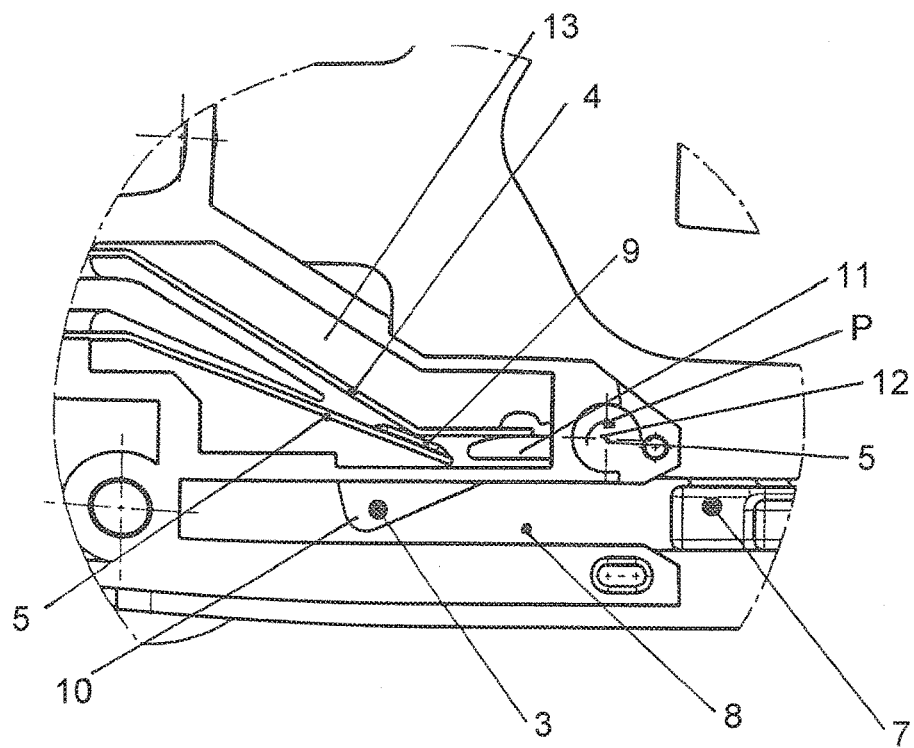
FIG. 5 shows the switch in the "closed position" of the contact elements.

The coupling member 3 depicted larger in FIG. 4 includes a rod-shaped bearing pin 12 having a circular cross-section and two end-side bearing sections. The coupling member 3 is pivotably supported about a pivot axis S in the housing 1, which pivot axis S is identical to the longitudinal axis of the bearing pin 12. A first section 10 and a second section 11 extend radially outward from the bearing pin 12. The two sections 10 and 11 are in the form of lever arms, which are disposed adjacent to each other, i.e., offset on the bearing pin 12 in the direction of the longitudinal axis of the bearing pin 12. The two sections 10 and 11 are differently oriented such that the first section 10 in the "closed position" (i.e. providing a closed electrical circuit) depicted in FIG. 5 of the contact elements 4 and 5 protrudes into the insertion channel 8, and the second section 11 abuts on the underside of the upper contact element 4. The upper contact element abuts in this position on the projection 9 of the lower contact element 5; the electrical contact is thus closed.

The contact spring, i.e., the upper contact element 4, includes a first strip 14 extending obliquely downward and a retaining section 15 extending in the horizontal direction in the "closed position" from the strip 14 at an angle. In the "closed position" the contact spring abuts with the edge of the transition from the strip 14 in the retaining section 15 on the projection 9 of the lower contact element 5, so that a very small, in the ideal case punctiform contact arises between the contact elements 4 and 5. For this purpose the projection 9 is configured strip-shaped and oriented with its longitudinal axis perpendicular to the edge abutting thereon of the upper contact element 4. Furthermore, a groove 16 is provided in the retaining section 15, into which the coupling member 3 engages with a projection 17 provided on the second section 11. The groove 16 and the projection 17 engaging therein form an interference-fit connection of the contact spring and of the coupling member 3, which makes possible a movement of the two parts exclusively in the direction of the longitudinal axis of the groove 16. In the other directions the interference-fit connection forms a securing against an inadvertent slipping of the contact spring from the coupling member 3. The groove 16 is thus oriented and shaped such that its longitudinal axis in the installed state extends perpendicular to the pivot axis S of the coupling member 3 so that the coupling member 3 can pivot about the pivot axis S, while the projection 17 performs a longitudinal movement here in the groove 16.

Figure 6:
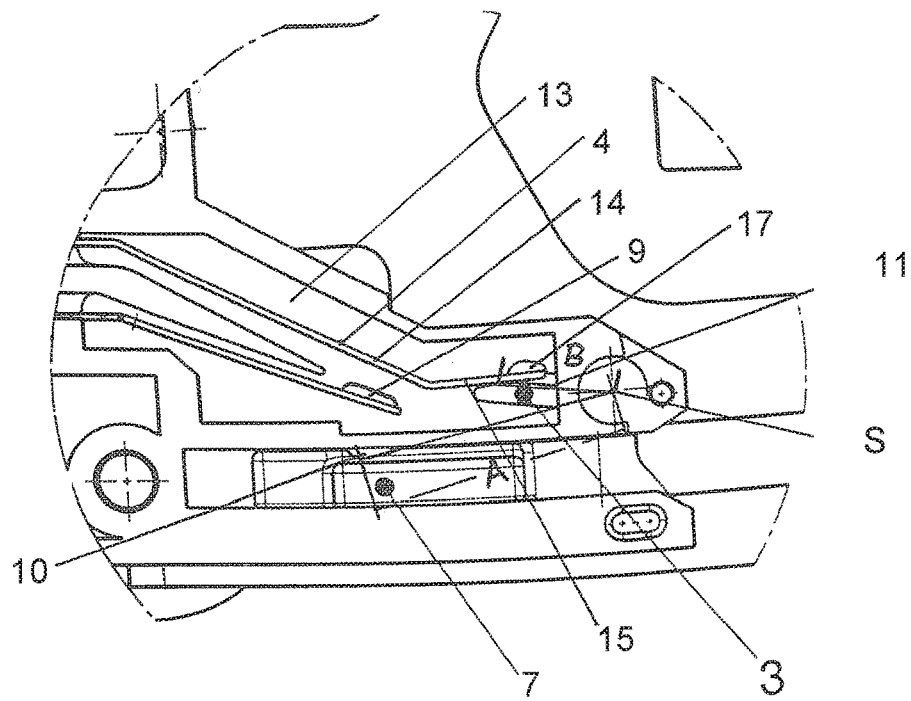
FIG. 6 shows the switch in the "open position" of the contact elements.

When applying the seatbelt, the occupant pushes a belt tongue into a belt buckle (not shown), whereby in the present embodiment, an ejector 7 is pushed into the insertion channel 8. However, instead of the ejector 7 the belt tongue itself, a locking part, or a part movably coupled with one of these parts can be pushed into the insertion channel 8. During the pushing-in movement in the insertion channel 8 the ejector 7 initially comes into abutment on the first section of the coupling member 3, and the coupling member 3 subsequently pivots into the position shown in FIG. 6. Due to the pivoting of the coupling member 3, the contact spring is raised over the second section 11 of the coupling member 3 and the contact between the contact elements 4 and 5 is lifted. This position is also referred to as the "open position" of the switch (creating an open electrical circuit). Since in the "closed position" of the switch, the contact spring already abuts on the second section 11 of the coupling member 3, the contact spring is lifted immediately at the start of the pivot movement of the coupling member 3. In addition, the coupling member 3 is simultaneously urged into the insertion channel 8 with the first section 10 by the abutment of the contact spring in the "closed position" of the switch.

The distance A between the pivot axis S and the contact surface on which the ejector 7 abuts on the first section 10, is deliberately larger than the distance B between the pivot axis S and the contact surface on which the upper contact element 4 abuts on the second section 11. A translation can thereby be realized, using which the force exerted by the ejector 7 on the coupling member 3 is translated into a larger force exerted by the coupling member 3 onto the contact spring. Furthermore, the path travelled by the second section 11 of the coupling member 3 and by the contact spring can be translated into a shorter path length with respect to the path travelled by the first section 10, so that the required free space 13 can be dimensioned correspondingly small and the required installation space in the belt buckle is only slightly increased by the free space 13.

The sections 10 and 11 are laterally arranged on the bearing pin 12, i.e., the first section 10 is arranged on one side of the bearing pin 12, while the second section 11 extends outward from the first section 10, towards the center of the bearing pin 12. The sections 10 and 11 are each formed by lever arms, which extend outwards from the bearing pin at different radial angles. The bearing pin 12 extends laterally out over the sections 10 and 11 so that the bearing pin has corresponding free bearing sections at its ends, with which it is pivotably supported in the housing 1.

The contact of the contact elements 4 and 5 is deliberately disposed in a cavity of the housing 1. Due to the arrangement of the contact it can be protected from entering dirt particles. The transmission of the movement here is deliberately effected by the coupling member 3, which protrudes into the insertion channel with the first section 10 and can accordingly be configured in an abrasion-resistant manner. The coupling member 3 can be embodied, for example, as an injection-molded plastic part. The contact elements 4 and 5 can be manufactured as stamped parts from a metal plate, wherein the shape tolerance can be deliberately chosen larger due to the strip shape of the contact elements 4 and 5 and the inventive permanent abutment of the upper contact element 4 on the second section 11 of the coupling member 3. In addition due to the inventive solution, the contact elements 4 and 5 are only slightly moved for closing and opening the contact, so that the probability of damage can be significantly reduced even after a large number of locking operations of the belt buckle.

While the above description constitutes the preferred embodiment of the present invention, it will be appreciated that the invention is susceptible to modification, variation and change without departing from the proper scope and fair meaning of the accompanying claims.

The invention claimed is:

1. A switch for a belt buckle of a seatbelt device, the belt buckle receiving a belt tongue, the switch comprising;
    at least two contact elements abutting on each other or reaching into abutment on each other in a cavity of the switch, wherein at least one of the contact elements is configured as a movable contact spring,
    an insertion channel into which a portion of one or more of the belt tongue, a locking part, and an ejector is insertable into the belt buckle during a locking movement and removed from the belt buckle during an unlocking movement of the belt tongue,
    a movably supported coupling member, which protrudes with a first section into the insertion channel and includes a second section coupled with the contact spring, and the movably supported coupling member second section abuts the contact spring, wherein the coupling member and the contact spring are movably guided with respect to each other by an interlocking engagement for preventing a slippage of the contact spring from the coupling member.

2. A switch according to claim 1, further comprising;

a groove in the contact spring and a projection of the coupling member which projection engages in the groove to provide the movable guidance.

3. A switch according to claim 2, further comprising;

the coupling member is pivotably supported and the contact spring is disposed with respect to the coupling member such that the groove is oriented with a longitudinal direction perpendicular to the pivot axis of the coupling member.

4. A switch according to claim 1 further comprising;

in a position wherein the coupling member first section protrudes into the insertion channel the contact elements abutting on each other, and the coupling member is fixed in the position in at least one direction by an abutment on the contact spring and the abutting of the contact spring on the other contact element.

5. A switch according to claim 1 further comprising;

the coupling member includes at least one bearing pin, via which the coupling member is pivotably supported about a pivot axis, and the first and the second section extend radially outward with respect to the pivot axis.

6. A switch according to claim 5, further comprising;

the first and the second section are disposed offset to each other in the longitudinal direction of the bearing pin.

7. A switch according to claim 5, further comprising;

a first distance between a contact point on which a part of the ejector insertable into the insertion channel comes into abutment on the first section and the pivot axis is larger than a second distance between a contact point on which the contact spring abuts on the second section and the pivot axis of the coupling member.

8. A switch according to claim 1 further comprising:

wherein the movable contact spring forms an open electrical circuit in the locking movement of the belt buckle.

9. A switch according to claim 1 further comprising:

wherein the belt tongue is inserted and removed from the insertion channel in the locking and the unlocking movements.

10. A switch for a belt buckle of a seatbelt device, the belt buckle receiving a belt tongue, the switch comprising:

at least two contact elements abutting on each other or reaching into abutment on each other in a cavity of the switch, wherein at least one of the contact elements is configured as a movable contact spring, an insertion channel into which a portion of one or more of the belt tongue, a locking part, and an ejector is insertable into the belt buckle during a locking movement and removed from the belt buckle during an unlocking movement of the belt tongue, and a movably supported coupling member, which protrudes with a first section into the insertion channel and includes a second section coupled with the contact spring, and the movably supported coupling member second section abuts the contact spring, wherein the coupling member and the contact spring are movably guided with respect to each other by an interlocking engagement, and wherein a groove in the contact spring and a projection of the coupling member which projection engages in the groove to provide the movable guidance.

* * * * *